(12) United States Patent
Stratico et al.

(10) Patent No.: US 6,467,718 B2
(45) Date of Patent: Oct. 22, 2002

(54) WIRE GUIDE FOR WINDING DYNAMO-ELECTRIC MACHINE STATORS WITHOUT SHROUDS

(75) Inventors: Gianfranco Stratico, Siena; Pasquale Ciarlitto, Florence, both of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 10/012,870

(22) Filed: Nov. 5, 2001

(65) Prior Publication Data

US 2002/0043582 A1 Apr. 18, 2002

Related U.S. Application Data

(63) Continuation of application No. 09/479,571, filed on Jan. 7, 2000, now Pat. No. 6,325,318.
(60) Provisional application No. 60/115,690, filed on Jan. 13, 1999.

(51) Int. Cl.[7] .............................................. H02K 15/09
(52) U.S. Cl. .............................. 242/433.4; 242/432.6; 29/596
(58) Field of Search .................. 242/432.3, 432.6, 242/433.4, 432.2, 432.4, 432.5; 29/596

(56) References Cited

U.S. PATENT DOCUMENTS

| | | | |
|---|---|---|---|
| 2,810,848 A | * | 10/1957 | Roberts ................ 242/433.4 |
| 4,612,702 A | | 9/1986 | Wheeler ................... 29/596 |
| 4,762,283 A | | 8/1988 | Sabatino |
| 4,765,054 A | | 8/1988 | Sauerwein et al. ........... 29/596 |
| 4,858,835 A | | 8/1989 | Luciani et al. |
| 4,991,782 A | | 2/1991 | Luciani |
| 5,193,755 A | | 3/1993 | Luciani |
| 5,197,665 A | * | 3/1993 | Banner ................... 242/432.6 |
| 5,214,838 A | | 6/1993 | Beakes et al. ............... 29/596 |
| 5,664,317 A | | 9/1997 | Ponzio et al. ................ 29/596 |
| 5,687,927 A | * | 11/1997 | Beakes et al. .......... 242/432.6 |
| 5,906,331 A | * | 5/1999 | Ruoss ................... 242/432.6 |
| 5,946,792 A | | 9/1999 | Beakes ....................... 29/596 |

FOREIGN PATENT DOCUMENTS

| | | |
|---|---|---|
| DE | 33 28 403 | 2/1984 |
| EP | 0 040 115 | 11/1981 |
| EP | 0 575 085 | 12/1993 |
| GB | 2 068 787 | 8/1981 |

* cited by examiner

Primary Examiner—Emmanuel M. Marcelo
(74) Attorney, Agent, or Firm—Fish & Neave; Robert R. Jackson; Evelyn C. Mak

(57) ABSTRACT

In a dynamo-electric machine, a stator having a terminal board with at least one pair of slots located along its inside circumference, includes at least one pair of coil holders. Each coil holder is cantilevered from the terminal board at the ends of a pair of slots, and a wire guide is positioned on each coil holder. A wire depositing needle and the stator are placed in relative motion, which causes the guide to support the wire as it is transported along its surface. Coils of wire are created as each pair of slots is wound. The invention will typically be used to form multiple coil windings on a single stator.

14 Claims, 5 Drawing Sheets

WIRE GUIDE FOR WINDING DYNAMO-ELECTRIC MACHINE STATORS WITHOUT SHROUDS

CROSS REFERENCE TO RELATED APPLICATIONS

This is a continuation of patent application Ser. No. 09/479,571 filed Jan. 7, 2000, now U.S. Pat. No. 6,325,318 which claims the benefit of U.S. provisional patent application No. 60/115,690, filed Jan. 13, 1999, which is hereby incorporated by reference herein in its entirety.

BACKGROUND OF THE INVENTION

The present invention concerns the manufacture of electric motors and generators, and similar apparatus. More specifically, the invention relates to improved solutions for winding stators for dynamo-electric machines.

Electric motors generally include two main parts—a fixed hollow portion known as a "stator" and a portion that rotates inside the stator, called a "rotor" or an "armature." Electrically conducting coils of wire are typically wound in longitudinal slots on the terminal board portion of the stator. Rotors are configured in many different ways, but they are also wound with electrically conducting wire. Current supplied to the rotor wires interacts with a magnetic field that is produced in the stator to create the torque required to operate the motor. Electrical generators have stators and rotors that are similar in a general way to those described above for electric motors.

Various types of machines are available to form windings on stator cores. Some machines include needles, driven with rectilinear reciprocating motion combined with reciprocating rotary motion about their axes, to carry copper wire from a reel and place it in the stator slots. In one such device, the needle is aligned coaxially to the central axis of the stator. Because this configuration fails to position the point of the needle such that the wire can be placed in all areas of the slot, "shrouds" or "shoes" are typically placed at the ends of the slots to guide the wire into proper position. More specifically, a retaining tooth is usually present at the end of the slot to support the portion of the wire that rests above the slot as winding proceeds. When a device such as that described above is used, the needle cannot extend far enough to bring the wire past this retaining tooth during winding. The wire emitted from the needle rides along the surface of the shoes and into proper position in the slot.

While using shoes to aid in winding is an acceptable solution, considerable effort is required to use them. For example, because the shoes occupy large amounts of space, particularly extending in the direction parallel to the longitudinal direction of the stator, the needle has to travel through a longer winding stroke in order to place the wire in position next to the shoes. Moving the needle through longer winding strokes substantially increases the amount of time that must be allotted to winding the stator, which is an undesirable result. Reaching the increased stroke distance also requires the use of a longer needle. Since winding needles are typically cantilevered from the actuator, longer needles are subject to additional flexion which must be countered by increasing the stiffness of the needle.

In addition, the appropriate size of the shoes must be chosen based upon the dimensions of the stator, and inaccurate shoe sizing can result in failed attempts to form the winding. Further, complicated mechanisms must be used to add and remove the shoes. This again adds a considerable amount of time to the winding process. Expending so much energy supplying devices that form no part of the final product is highly inefficient. Thus, it is advantageous to form windings on stator cores using a device that does not require the use of shoes.

Winding machines that do not require the use of shoes are available. In these devices, the needle is typically aligned within the stator such that it may position wire anywhere in the slots. One such device positions the winding needle such that its rotation and advancement axis is eccentric with respect to the central longitudinal axis of the stator. This type of device is disclosed in U.S. Pat. No. 4,991,782 to Luciani, issued Feb. 12, 1991 and assigned to the assignee of the present invention, the contents of which are hereby incorporated by reference in their entirety. In another device, the end of the needle has two opposing points, which are orthogonal to the needle. These needle ends diverge when the needle is external to the stator during its rotation, and then converge when the needle is inside the stator, to deposit wire in the slots. Such a device is disclosed in U.S. Pat. No. 4,762,283 to Sabatino (more accurately Luciani), issued Aug. 9, 1988 and in U.S. Pat. No. 4,858,835 to Luciani et al. issued Aug. 22, 1989 both assigned to the assignee of the present invention, the contents of which are hereby incorporated by reference in their entirety.

While such winding devices are quite useful in forming windings on many stators, they sometimes produce unacceptable windings. For example, winding stators that have slots spaced far apart often results in an unevenly distributed wire coil. That is, the wire tends to bunch up against the terminal board on the side where the needle exits the stator core, and to extend along the terminal board on the side where the needle enters the stator core. Uneven wire distributions are also sometimes produced when the gap between the ceiling of the slot and the surface of the coil holder that supports the coil is very small. These uneven windings reduce the overall slot fill capacity of the stator. Thus in addition to winding the stator without using shoes, it is also desirable to produce an evenly distributed winding.

In view of the foregoing, it is an object of this invention to provide improved methods and apparatus for placing an even winding on a dynamo-electric machine stator.

It is another object of this invention to place such even windings on the stator without using shoes to guide the wire into proper position.

SUMMARY OF THE INVENTION

These and other objects of the invention are accomplished in accordance with the principles of the invention by providing a system for winding wire on a dynamo-electric motor stator which includes a laminate stack with a terminal board applied to each end. Coil holders are cantilevered from each terminal board, and are positioned longitudinally opposite such that an oppositely positioned pair of coil holders forms at least one pair of longitudinal slots along an inside circumference of said laminate stack.

A tooth which extends from an end of the coil holder lies opposite the terminal board, and a wire delivering needle is placed adjacent to the terminal board such that it may deliver wire to all portions of the longitudinal slots. A wire guide is positioned next to a longitudinal slot pair such that a wire guide transporting surface extends from the coil holder tooth in a direction toward a side of said terminal board in which said wire enters said longitudinal slot. The transporting surface is shaped to cause the placement of the wire to be stalled until the wire is in a position to produce a symmetrical coil.

In accordance with another aspect of the invention, a method of placing substantially even coil sections on a dynamo-electric motor stator includes positioning a wire delivering needle such that it may deliver wire to all portions of a pair of longitudinal slots inside the stator, and causing relative motion between the needle and the stator. The wire is supported on a wire guide portion of the stator as it is delivered from the needle, and is deposited into the slot when it is in a position relative to the slot that will produce a symmetrical coil.

BRIEF DESCRIPTION OF THE DRAWINGS

The above and other objects and advantages of the invention will be apparent upon consideration of the following detailed description, taken in conjunction with the accompanying drawings, in which like reference character s refer to like parts throughout, and in which.

DETAILED DESCRIPTION OF THE PREFERRED EMBODIMENTS

Figure 1:
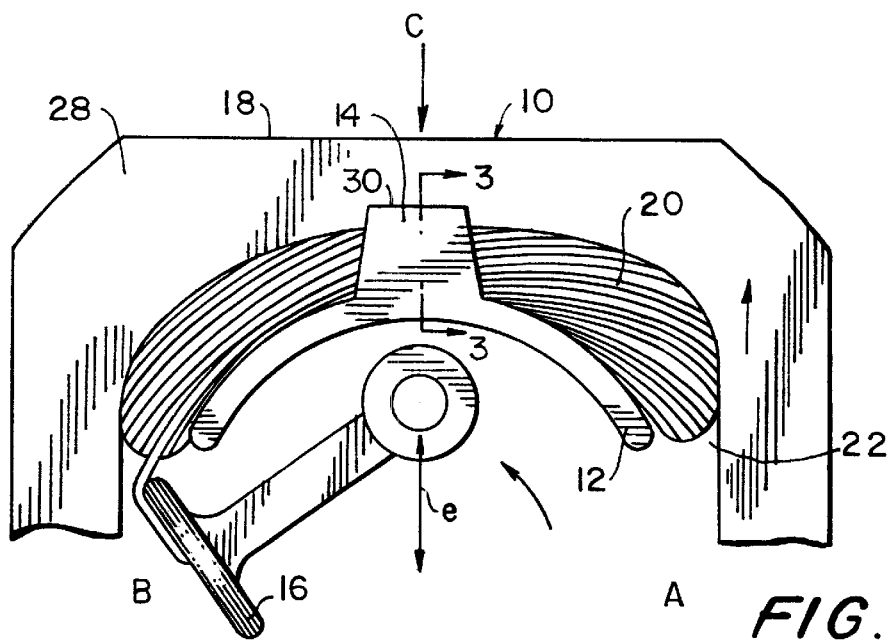
FIG. 1 is a partial front view of a prior art stator with a winding formed without the use of shoes.

Turning now to the drawings, which are provided to illustrate embodiments of the invention and pot for limiting same, FIG. 1 shows an example of a currently available stator 10 upon which a wire winding may be formed without the use of shoes. Stator 10 is typically made from a terminal board 18 which is applied to the end of a laminate stack. Stator 10 also includes a coil holder 12 which is cantilevered from terminal board 18. In the preferred embodiment of the invention, coil holder 12 has an arcuate shape. However, those skilled in the art will recognize that other shapes may be used to support the coil during its formation. A tooth 14 at an end of coil holder 12 extends away from the central stator axis, and protrudes radially past terminal board 18.

Figure 2:
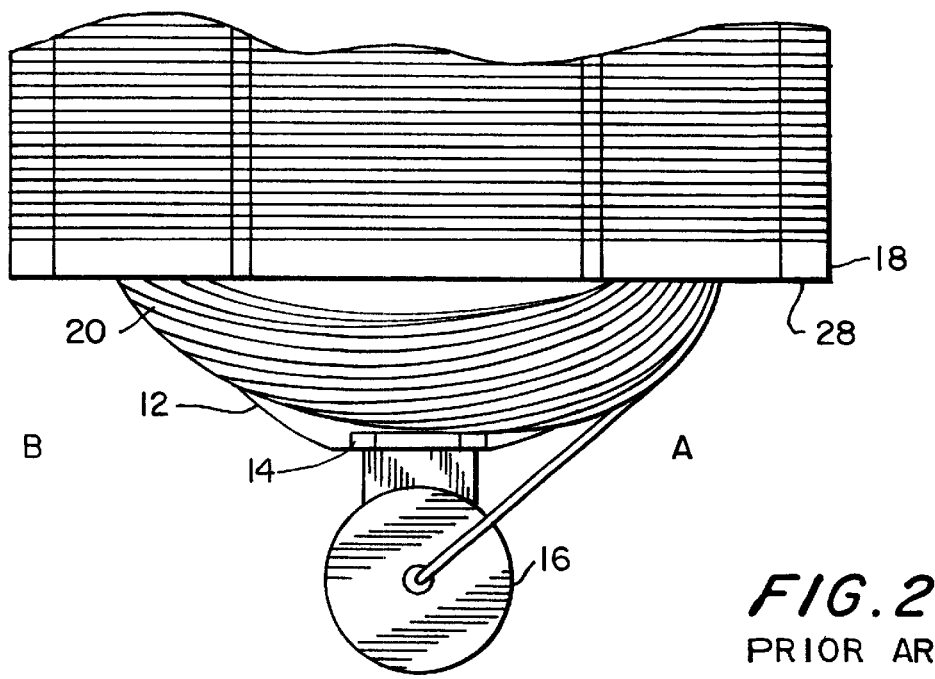
FIG. 2 is a partial plan view of the prior art stator and coil winding illustrated in FIG. 1 viewed from the direction of arrow C.

Turning to FIG. 2, coil holder 12 typically has one end that is connected to terminal board 18, while the end that supports tooth 14 sits opposite terminal board 18, and preferably parallel to it. During winding, needle 16 carries copper wire from a reel and places it in slots 22 that are dispersed along the interior longitudinal surface of stator 10 formed between coil holder 12 and terminal board 18. In the illustrated device, the longitudinal axis of needle 16 is aligned parallel and eccentric to the central longitudinal axis of the stator. Those skilled in the art will appreciate that other needle alignments may be used. What is desired is to provide a needle positioning that will allow wire to be placed anywhere in slots 22. In the illustrated device, rectilinear and rotary motion of needle 16 are repeated to create a winding with multiple turns.

While only one coil holder 12 is shown, it should be noted that pairs of coil holders 12 are most often provided, one at each end of the stator. Multiple coil holder pairs may also be placed on a stator 10 when it is desired to deposit multiple coil windings on the stator.

Figure 3:
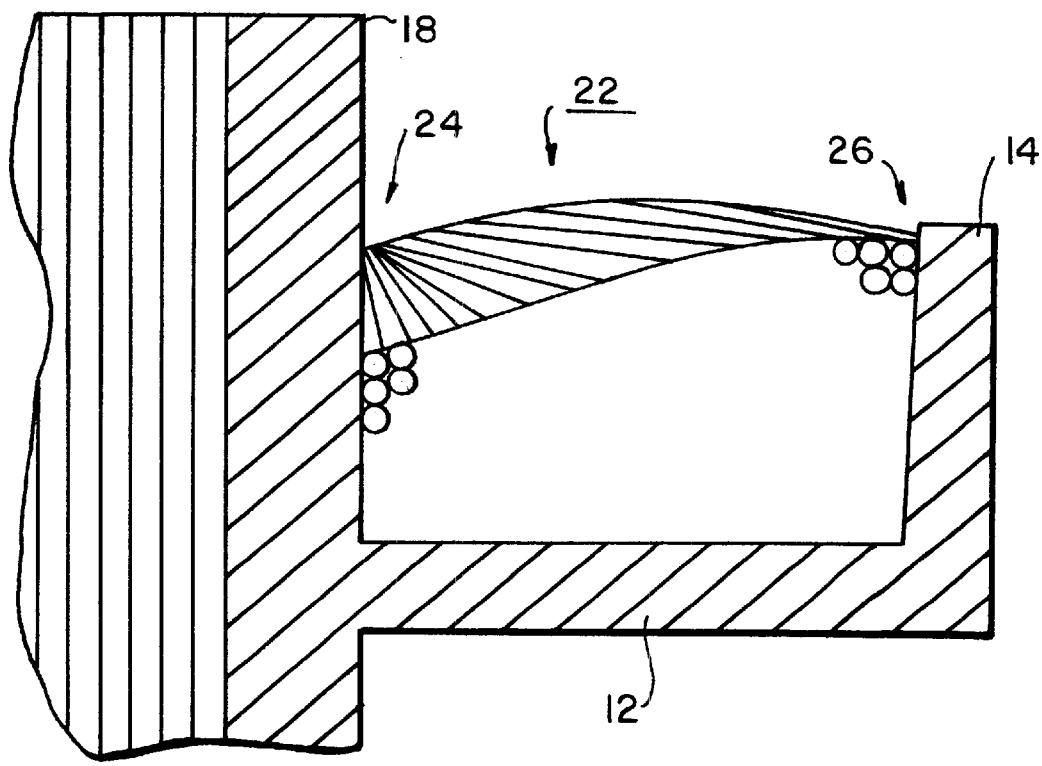
FIG. 3 is a partial section view taken along the line 3—3 in FIG. 1.

As illustrated in FIGS. 1 and 2 on certain occasions, windings 20 that are produced using a prior art device such as that described above can be unevenly distributed. That is, as needle 16 moves around coil holder 12, wire tends to bunch up against the surface 28 of terminal board 18 on the side where the needle exits slot 22 (shown as side A in the illustration), and extends along the surface of stator 10 where the needle enters slot 22 (side B). Such uneven wire distributions result from various scenarios, most notably from having slots 22 that are spaced laterally distant from each other and from having coil holders 12 with wire supporting surfaces that are located relatively close to the ceiling of slot 22. FIG. 3 contains a detailed view of section 3—3 in FIG. 1 showing coil holder 12, at a point that includes tooth 14. As shown in the illustration, relatively few wires are placed in area 24 near the outer surface of terminal board 18, as compared to area 26 near the inside of tooth 14.

Figure 4:
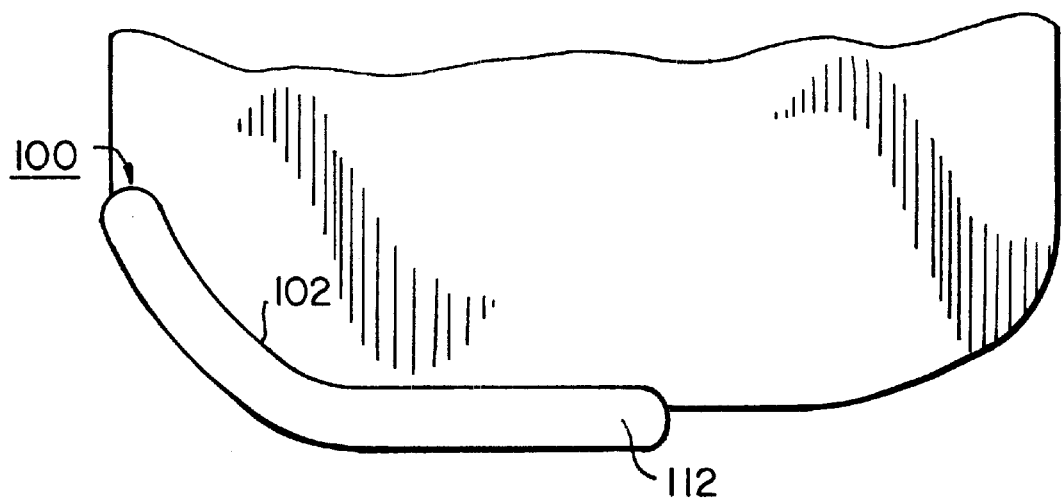
FIG. 4 is a plan view of an embodiment of a wire guide of the present invention.
Figure 5:
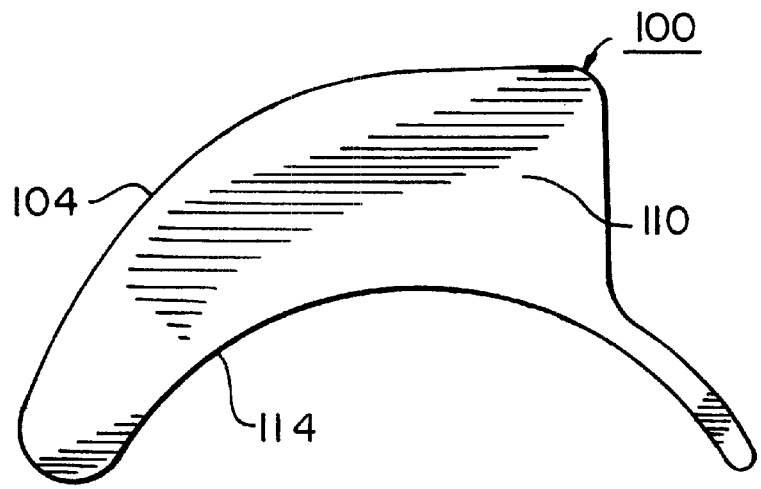
FIG. 5 is a front view of an embodiment of a wire guide of the present invention.

Turning now to FIGS. 4 and 5, the present invention includes a guide 100 which can be attached to a stator 10 to reduce or eliminate the uneven wire distribution problem described above. More specifically, guide 100 can be attached to the ends of coil holder 12, to delay the placement of the wire until such time as the wire is in a position to produce a symmetrical coil 20. Guide 100 includes a supporting surface 114 with an edge 102 that corresponds to a shape of the end of coil holder 12. In the preferred embodiment of the invention, the shape of edge 102 will conform exactly to the shape of the end of coil holder 12. The embodiment of the invention shown has an edge 102 of guide 100 that is curved, since that is the shape of coil holder 12.

Guide 100 also includes a retaining surface 110, which is preferably attached to supporting surface 114 along edge 102. A transporting surface 104 is attached to retaining surface 110 along an edge opposite edge 102 to support the wire on coil holder 12. As stated earlier, transporting surface 104 is shaped to delay placement of wire into slot 22 until the wire is in a position to produce a symmetrical coil 20. In one embodiment of the invention, placement of wire into slot 22 is delayed until the wire depositing needle inside the stator begins the longitudinal, rectilinear portion of its motion through the stator. However, the ideal time delay for placement of wire in slot 22 will depend upon such factors as the geometry of the stator and relative positioning of the needle. Thus in other embodiments of the invention, wire placement may be delayed for a longer or shorter period of time.

In the preferred embodiment of the invention guides 100 are attached to coil holders 12 at both ends of stator 10. While it is possible to attach a guide 100 to just one coil holder 12, attaching guides to both ends of the stator is more likely to produce fully symmetrical coils 20. In the preferred embodiment of the invention, guides 100 are attached to a stator 10 such as the one described above with reference to FIGS. 1–3. Thus, coil holder 12 is cantilevered from terminal board 18, and preferably has an arcuate shape. Teeth 14 at an end of coil holder 12 extend away from the central stator axis, and protrude radially past terminal board 18.

Figure 6:
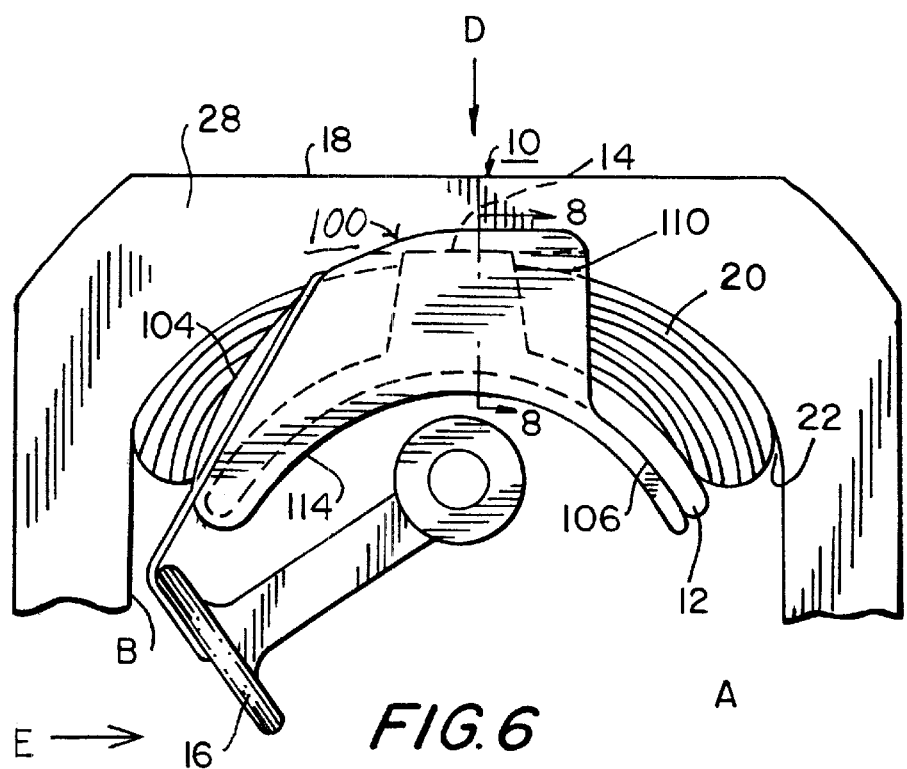
FIG. 6 is a partial front view of a stator that includes a wire guide in accordance with an embodiment of the invention.

Turning now to FIG. 6, in the preferred embodiment of the invention, guide 100 is attached to coil holder 12 such that retaining surface 110 is adjacent tooth 14. Transporting surface 104 preferably extends past an edge of said tooth in a direction toward side B of terminal board 18 where the wire enters slot 22. Supporting surface 114 is also preferably attached to the inside surface 106 of coil holder 12. Retaining surface 110 is preferably positioned such that it rests against tooth 14. Transporting surface 104 is then located further from the central axis of the stator than is the outside edge 30 of tooth 14.

Still referring to FIG. 6, in the preferred embodiment of the invention, outside edge 104 tapers inward (toward the central axis of the stator) on side B of the stator. While this configuration is most appropriate for the situation that has been described, it should be noted that the actual direction of the taper will be determined by the rotational direction of needle 16. More specifically, when a needle 16 that exits stator 10 on side A and enters on side B is used to wind stator 10, tapered portion 104 of guide 100 will preferably extend in the direction of side B. On the other hand, if a needle 16 that exits stator 10 on side B and enters on side A is used, taper 104 will preferably be on side A instead. The presence of the tapered portion of transporting surface 104 delays placement of the wire on coil holder 12 until needle 16 is in a position to deposit wire in a symmetrical coil 20.

Figure 7:
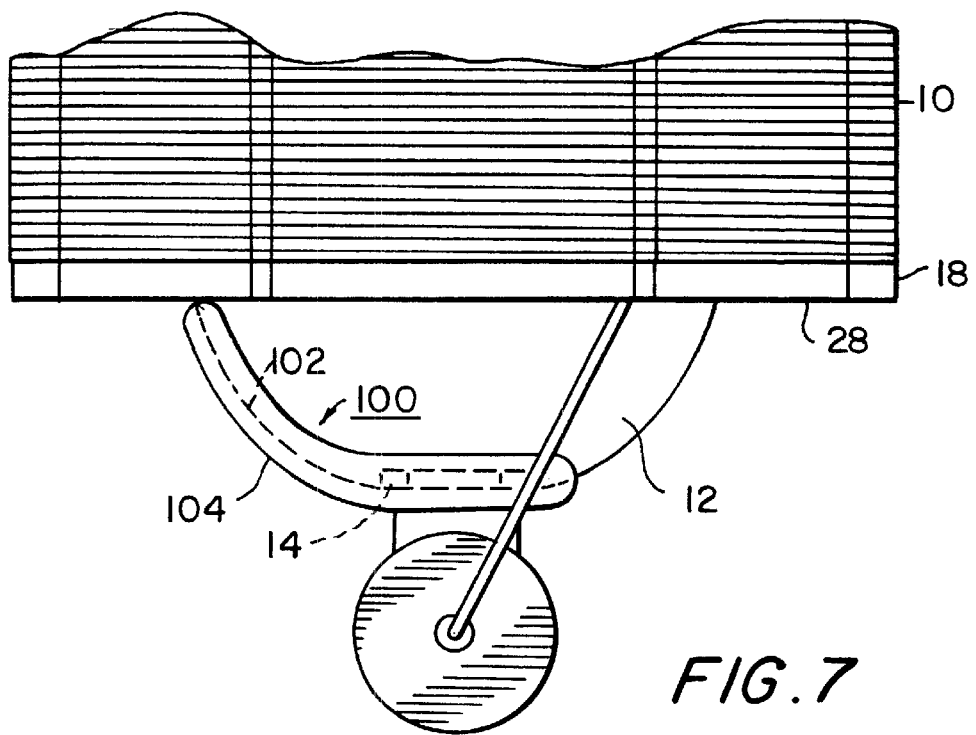
FIG. 7 is a partial plan view of a stator that includes a wire guide of the present invention viewed from the direction of arrow D in FIG. 6.

As indicated earlier, the shape of guide 100 also corresponds to the shape of the end portion of oil holder 12. More specifically, edge 102 will preferably have the same shape as the end of coil holder 12. Factors that are beyond the scope of this invention are often taken into account to determine the best shape for coil holder 12. For example, a curved end may reduce the deflection of coil holder 12 during winding. Or a smaller coil holder 12 with or without some type of deflection prohibiting support may be preferred because it enables more wire coils to be wound. In any event, in one embodiment of the invention edge 102 forms a tight fit with the end of coil holder 12 as shown in FIG. 7.

It should be noted that in addition to improving wire positioning, other advantages are gained by including guide 100 when forming windings. Notably, support surface 114 provides stiffening for the adjacent portion 112 of coil holder 12, while retaining surface 110 performs a similar function with respect to tooth 14. These added stiffnesses provide a significant advantage in that deflection of coil holder 12 can be reduced without changing the dimensions of coil holder 12. This may be particularly important when it is desired to place a high tension winding on the stator.

In accordance with an aspect of the invention, a wire delivering needle 16 is positioned inside stator 10 such that it may deliver wire to any and all portions of a pair of longitudinal slots 22 inside stator 10. Wire delivering needle 16 and stator 10 are then placed in relative motion to place wire in the various portions of slots 22. The wire is supported on wire guide 100 as needle 16 moves about the stator delivering wire from the needle. Wire is then deposited into slot 22 when the wire is in a position relative to said slot that will produce a symmetrical coil 20.

In one known device, needle 16 has a point that projects transverse to the longitudinal axis of the stator. It reciprocates along an eccentrically located axis adjacent to coil holder 12, and rotates about the longitudinal axis of stator 10 while its point is past and adjacent to guides 100 which rest outside teeth 14. In another device the end of needle 16 has two opposing points which repeatedly diverge and converge as needle 16 moves along the longitudinal axis of stator 10. Again, the needle delivers the wire to a point that is outside and adjacent to guide 100. These and other devices can be used to form windings in slots 22 which are dispersed along the inside longitudinal surface of stator 10 around the coil holder. Wire is deposited in a continuous loop, which means that a portion of the winding rests externally to slots 22. These portions are supported by coil holders 12.

During winding, (particularly during the rotation portion of the winding operation), the wire being delivered by needle 16 becomes supported by guide 100 and runs along surface 104 in the direction of the taper. Running the wire along guide 100 delays placement of the wire stretches onto coil holder 12, particularly on side B where needle 16 returns into stator 10. As needle 16 continues to rotate, delaying placement of the wire moves it in the direction of arrow E (FIG. 6). Thus, resting wire on guide 100 increases the number of wire stretches on side B that move closer to tooth 14, causing a wire placement that is similar to that on side A.

As before, multiple coil holders 12 may be simultaneously placed inside the circumference of stator 10 if it is desired to form more than one wire coil on the stator. When this is the case, needle 16 is properly placed with respect to the various coil holder 12 pairs and the operation described above is repeated for each. In this manner, wire may be wound evenly around coil holders 12 without the use of temporarily positioned shoes.

Figure 8:
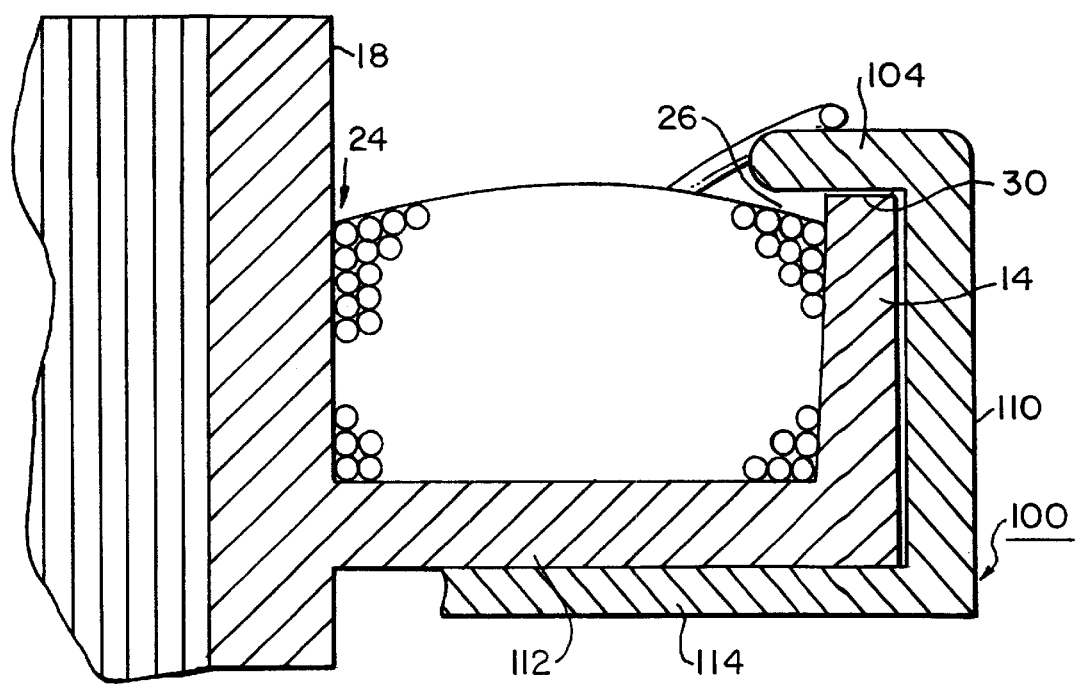
FIG. 8 is a partial section view taken along the line 8—8 in FIG. 6.

Referring now to FIG. 8, use of the invention produces a substantially even distribution of wire at the edges of coil holder 12 near external surface 28 of terminal board 18 and tooth 14. As shown, unlike the prior art device of FIG. 3, the shape of the wire coil at edges 24 and 26 is substantially the same when the present invention is used. Even placement of such wire results in a higher slot fill for the stator, and it is therefore, much more desirable than presently available winding methods and apparatus.

From the foregoing it will be apparent that there has been provided in accordance with the present invention a wire guide that evenly distributes wire without the use of shoes that fully satisfy the aims and advantages hereinbefore set forth. While this invention has been described in conjunction with specific embodiments thereof, it will be appreciated that many alternatives, modifications, and variations will be apparent to those skilled in the art. Accordingly, it is intended to embrace all such alternatives, modifications and variations that fall within the spirit and broad scope of the appended claims.

What is claimed is:

1. A method of winding a coil of wire on a pole that projects radially inwardly into the interior of a hollow annular stator body, a coil holder extending from an axial end of the pole and including a radially outwardly extending tooth portion that is axially spaced from an adjacent axial end of the stator body to define a slot in which the wire for a portion of the coil is gradually deposited from a wire outlet of a wire dispenser that alternately reciprocates through the interior of the stator body and oscillates in a predetermined direction past the coil holder with the wire outlet passing axially and radially outward relative to the tooth portion during the oscillation, the method comprising:

allowing the wire to extend undeflected from the wire outlet to the coil as the wire outlet moves toward the tooth portion in the predetermined direction; and deflecting the wire extending from the wire outlet to the coil radially outward between the wire outlet and the coil as the wire outlet moves away from the tooth portion in the predetermined direction.

2. The method of claim 1 further comprising:
prior to commencement of wire depositing, providing the coil holder with a wire guide that extends away from the tooth portion in the predetermined direction and that is configured to produce the deflecting.

3. The method of claim 2 wherein providing the coil holder with the wire guide comprises:
providing a supporting surface with an edge that conforms to a shape of an end of the coil holder; and
attaching the supporting surface to an inside surface of the coil holder.

4. The method of claim 3 further comprising:
providing a retaining surface that is attached to the supporting surface; and
positioning the retaining surface to rest against the tooth portion, wherein the retaining surface extends radially outward from an inner edge of one side of the supporting surface where the wire outlet moves toward the tooth portion in the predetermined direction to an outer edge of an opposite side of the supporting surface where the wire outlet moves away from the tooth portion in the predetermined direction.

5. The method of claim 4 further comprising:
providing a transporting surface that is attached to the retaining surface along an edge opposite the edge of the supporting surface, wherein the transporting surface extends beyond an outside edge of the tooth in a direction where the wire outlet moves away from the tooth portion in the predetermined direction.

6. The method of claim 5 further comprising:
tapering the transporting surface inward toward a central axis of the stator body in the direction where the wire outlet moves away from the tooth portion in the predetermined direction.

7. The method of claim 6 further comprising:
shaping the transporting surface to delay placement of the wire into the slot until the wire is in a position to produce a symmetrical coil.

8. Apparatus for use in winding a coil of wire on a pole that projects radially inwardly into the interior of a hollow annular stator body, a coil holder extending from an axial end of the pole and including a radially outwardly extending tooth portion that is axially spaced from an adjacent axial end of the stator body to define a slot in which the wire for a portion of the coil is gradually deposited from a wire outlet of a wire dispenser that alternately reciprocates through the interior of the stator body and oscillates in a predetermined direction past the coil holder with the wire outlet passing axially and radially outward relative to the tooth portion during the oscillation, the apparatus comprising:
a wire guide that allows the wire to move undeflected from the wire outlet to the coil as the wire outlet moves toward the tooth portion in the predetermined direction, and that extends away from the tooth portion in the predetermined direction and that is configured to radially outwardly deflect the wire extending from the wire outlet to the coil as the wire outlet moves away from the tooth portion in the predetermined direction.

9. The apparatus of claim 8 wherein the wire guide is mounted on the coil holder.

10. The apparatus of claim 8 wherein the wire guide comprises:
a supporting surface with an edge that conforms to a shape of an end of the coil holder and attaches to an inside surface of the coil holder.

11. The apparatus of claim 10 further comprising:
a retaining surface that is attached to the supporting surface and is positioned to rest against the tooth portion, wherein the retaining surface extends radially outward from an inner edge of one side of the supporting surface where the wire outlet moves toward the tooth portion in the predetermined direction to an outer edge of an opposite side of the supporting surface where the wire outlet moves away from the tooth portion in the predetermined direction.

12. The apparatus of claim 11 further comprising:
a transporting surface that is attached to the retaining surface along an edge opposite the edge of the supporting surface, wherein the transporting surface extends beyond an outside edge of the tooth in a direction where the wire outlet moves away from the tooth portion in the predetermined direction.

13. The apparatus of claim 12 wherein the transporting surface is tapered inward toward a central axis of the stator body in the direction where the wire outlet moves away from the tooth portion in the predetermine direction.

14. The apparatus of claim 13 wherein the transporting surface is shaped to delay placement of the wire into the slot until the wire is in a position to produce a symmetrical coil.

* * * * *